United States Patent [19]

Pool

[11] Patent Number: 4,709,610

[45] Date of Patent: Dec. 1, 1987

[54] CUTTING APPARATUS WITH AUTOMATIC FEED

[76] Inventor: James R. Pool, 402 Colorado St., Athens, Tex. 75751

[21] Appl. No.: 879,992

[22] Filed: Jun. 30, 1986

[51] Int. Cl.⁴ .......................... B26D 3/16; B26D 5/22
[52] U.S. Cl. ....................... 83/876; 83/229; 83/257; 83/277; 83/414
[58] Field of Search ............ 83/876, 884, 54, 203, 83/205, 222, 229, 276, 277, 409, 490, 414

[56] References Cited

U.S. PATENT DOCUMENTS

| | | | |
|---|---|---|---|
| 263,932 | 9/1882 | McCutcheon et al. | 83/226 X |
| 360,330 | 3/1887 | Seybold | 83/414 X |
| 1,780,680 | 11/1930 | Kay | 83/414 X |
| 2,617,176 | 11/1952 | McClellan et al. | 83/276 X |
| 3,286,744 | 11/1966 | Stall et al. | 83/409 X |
| 3,385,336 | 5/1968 | Barnard | 83/257 X |
| 3,779,115 | 12/1973 | Talbert | 83/276 X |
| 3,939,743 | 2/1976 | Coombes | 83/639 X |
| 4,187,750 | 2/1980 | Ito et al. | 83/222 X |

Primary Examiner—Paul A. Bell
Assistant Examiner—Hien H. Phan
Attorney, Agent, or Firm—Jerry W. Mills; Gregory M. Howison

[57] ABSTRACT

A cutting apparatus (10) having blades (42) disposed on a plate (32). A lever arm (50) moves the blades (42) up and down, simultaneously with a ratchet (72). On its upward stroke, the ratchet (72) rotates a chain (76). The rotation of the chain (76) moves a conveyor (97) holding the pipe (55) or other material to be cut into a position for the next cut.

25 Claims, 2 Drawing Figures

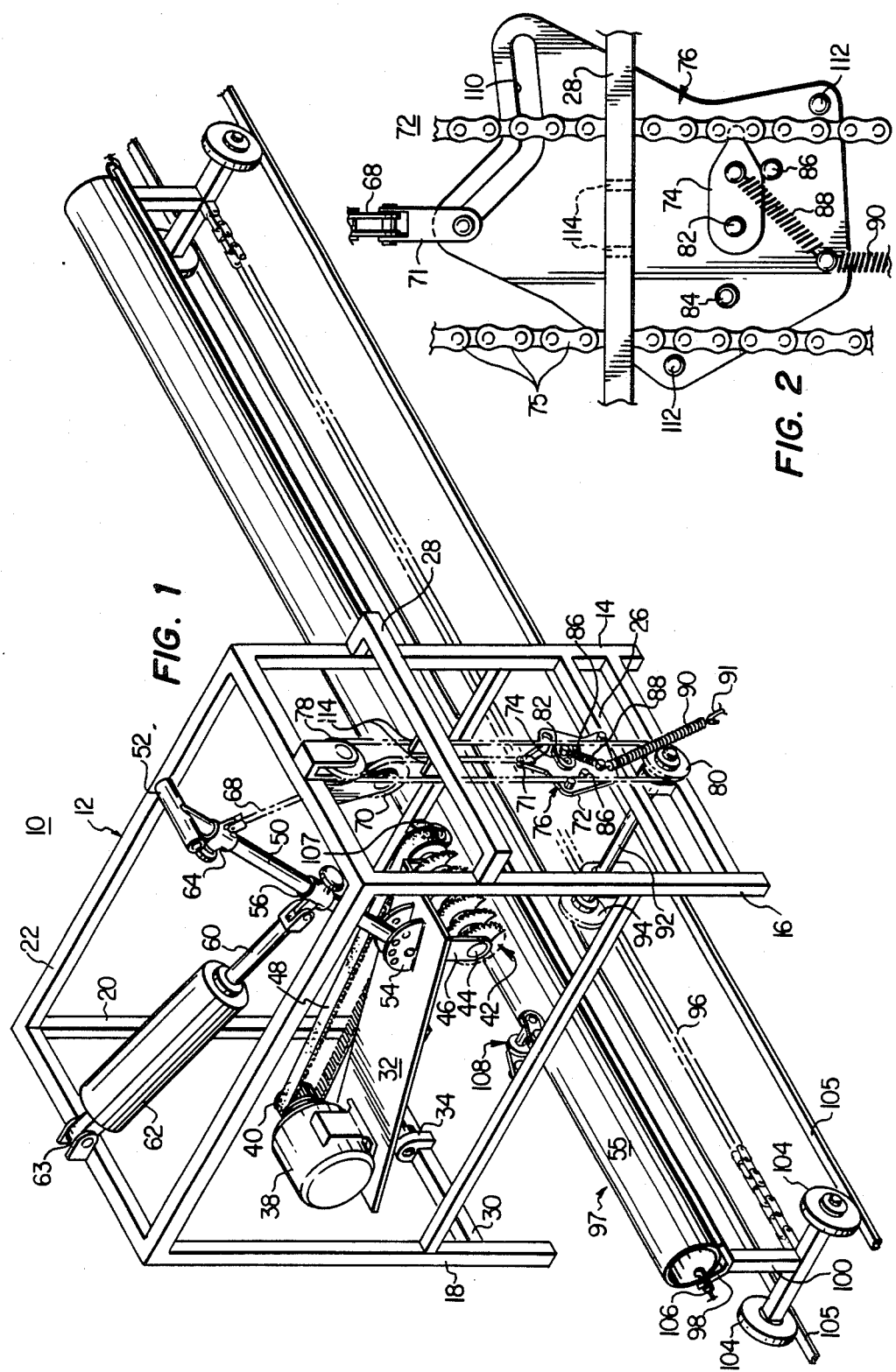

4,709,610

CUTTING APPARATUS WITH AUTOMATIC FEED

TECHNICAL FIELD OF THE INVENTION

The present invention pertains in general to a cutting apparatus and, more particularly, to an apparatus for cutting slots in a pipe at predetermined intervals.

BACKGROUND OF THE INVENTION

During well construction procedures, it is desirable to provide a filter to prevent particulate matter from the producing formation from entering the well with the produced fluids. To filter out this particulate matter, well screens are utilized which are commonly comprised of some form of slotted pipe. The size of the particulate matter excluded from flow therethrough depends upon the size of the slots. Additionally, the number of slots in the pipe determines the flow rate of the particulate matter therethrough.

Fabrication of the well screen commonly utilizes pipe usally formed from flexible manmade materials such as polyvinyl chloride, teflon and polyethylene. In order to form the slots therein, a rotary sawblade is utilized. The pipe is placed on a conveyor platform and is passed under the blade.

U.S. Pat. No. 4,567,795 issued to J. R. Pool discloses an apparatus for cutting a plurality of transverse slots in a length of flexible tubing. However, in the Pool Patent, the operator of the slot-cutting apparatus must manually turn a crank in order to reposition the pipe after each cut. This manual repositioning of the pipe reduces operator efficiency and also may result in the manufacture of defective well screens due to improper alignment of the flexible pipe.

In view of the above disadvantages, there exists a need for a tube slotting apparatus that form slots in a flexible tube and provides for automatic repositioning of the flexible tube after each cut in a low cost and high efficiency manner.

SUMMARY OF THE INVENTION

The present invention disclosed and claimed herein comprises a slot cutting apparatus for cutting a plurality of transverse slots in a length of flexible tubing. The slot cutting apparatus includes a plurality of rotary sawblades mounted on a common shaft and disposed on a support over a tube or other material to be cut. A motor is also disposed on the support for rotating the shaft. The support is pivotable such that the sawblades can be brought into contact with the upper surface of the tube. The support is pivotably mounted to a lever arm and a hydraulic cylinder. When the lever arm is pulled towards the operator, the rotary blades are lowered and engaged with flexible pipe. When the lever arm is pushed away from the operator, the blades are lifted and disengaged from the flexible pipe. The lever arm is also engaged to a ratchet mechanism such that when the operator pushes the arm away to disengage the blades, the ratchet is pulled upwards. The upward movement of the ratchet rotates a circular chain to which the ratchet is engaged. The rotation of the chain rotates a first sprocket which is mounted on a shaft with a second sprocket. The rotation of the second sprocket moves a second chain to which a conveyor holding the tubing is connected. The rotation of the second sprocket moves the pipe to a position for the next cut. Thus, with a single motion of the level arm, the operator can disengage the blades from the flexible pipe and simultaneously reposition the pipe to its proper position for the next out.

In another embodiment of the present invention, a single blade is mounted on the apparatus, in order to cut a tube, or other material, into predetermined lengths.

In a further embodiment of the present invention, the hydraulic cylinder is coupled with a control system to allow for automatic movement of the lever arm without the need for manual intervention.

BRIEF DESCRIPTION OF THE DRAWINGS

For a more complete understanding of the present invention and the advantages thereof reference is now made to the following description taken in conjunction with the accompanying Drawings in which:

FIG. 1 illustrates a perspective view of a slot cutting apparatus in accordance with the present invention; and FIG. 2 illustrates a perspective view of the ratchet mechanism which initiates movement of the pipe.

DETAILED DESCRIPTION OF THE INVENTION

Referring now to FIG. 1, there is illustrated a perspective view of a slot cutting apparatus 10 of the present invention. The slot cutting apparatus 10 includes a platform 12 which includes four vertical supports 14, 16, 18, and 20 connected between the corners of an upper rectangular surface 22. Front vertical supports, 14 and 16, are connected by front stabilizing bar 24, lower stop bar 26 and upper stop bar 28. The rear vertical support legs are connected to a plate support bar 30. A plate 32 is pivotably connected to the plate support bar 30 by means of two collars, one of which is shown as 34. A motor 38 having a motor shaft 40 is mounted to one end of the plate 32. Beneath the other end of the plate 32, a plurality of rotary sawblades 42 are mounted to a blade shaft 44 and connected to the plate 32 by means of two mounts, one of which is shown as 46. The motor shaft 40 is connected to the blade shaft 44 by a belt-drive system 48.

A lever arm 50 with a handle 52 is attached to the upper surface of the plate 32 above the rotary sawblades 42 by means of a lever mount 54. The lever arm 50 can be mounted at various angles within the lever mount 54, in order to accommodate different sizes of pipe 55. A first slideably adjustable bushing 56 pivotably engages the lever arm 50 to the piston 60 of a hydraulic/air cylinder 62. The hydraulic/air cylinder 62 is mounted to the upper rectangular surface 22 by means of a cylinder collar 63.

A second slideably adjustable bushing 64 is engageable on the lever arm 50 above the first slideably adjustable bushing 56. The second slideably adjustable bushing 64 connects the lever arm 50 to one end of a connecting chain 68. The connecting chain 68 passes over a rotating positioning sprocket 70, and the other end of the connecting chain 68 terminates in a clevis 71 which mounts to a ratchet 72. Thus, by pushing or pulling handle 52, the ratchet 72 may be raised or lowered between the lower and upper stop bars, 26 and 28.

The ratchet 72 has an engaging tooth 74, the tip of which can be inserted into any of the links 75 in a circular chain 76. The circular chain 76 is engaged about two sprockets, an upper sprocket 78 and a lower sprocket 80 which are mounted on the upper rectangular surface 22 and front stabilizing bar 24, respectively. The engaging tooth 74 rotates about a pivot 82; the tooth is prevented from rotating below a horizontal position by pegs 84 and 86. An engaging spring 88, connected between the bottom of the ratchet 72 and the engaging tooth 74, provides a force which pulls the engaging tooth 74 towards a horizontal position, against the circular chain 76. Thus, when the ratchet 72 is pulled upward, the engaging spring 88 pulls engaging tooth 74 towards the circular chain 76, and the upward movement of the ratchet 72 allows the engaging tooth 74 to slide into a link in the circular chain 76. Subsequent upward movement of the ratchet 72 will cause the circular chain 76 to rotate. The direction of the rotation of the circular chain 76 depends upon the orientation of the engaging tooth 74; engaging the engaging tooth 74 in one of the links 75 on the right side of the circular chain 76 (as shown) will cause counter clockwise rotation, and engaging the engaging to the left side of the circular chain 76 will cause clockwise rotation. The tooth 74 disengages while the ratchet 72 is being lowered in order to prevent rotation of the circular chain 76. A lowering spring 90 is connected between the ratchet 72 and an anchor 91 located several inches in front of the front stabilizing bar 24 to facilitate lowering of the ratchet 72 to its initial rest position against the lower stop bar 26 and to maintain contact between the ratchet 72 and the circular chain 76.

The rotation of the circular chain 76 results in rotation of the lower sprocket 80. Lower sprocket 80 is connected to one end of drive shaft 92. The other end of drive shaft 92 is connected to driving sprocket 94. The teeth of driving sprocket 94 engages with a drive chain 96.

A conveyor is referred to generally by the reference number 97. A tube guide 98, supporting pipe 55, is supported on each end by vertical support members 100 and 102. In the illustrated embodiment, the support members, 100 and 102, are connected to wheels 104 which allow the conveyor 97 to move along tracks 105. The tubing guide 98 holds the pipe 55 while it is being cut by the blades 42. The drive chain 96 extends between the vertical support members, 100 and 102, of the conveyor 97, and interacts with the teeth of the driving sprocket 94. A clamping member 106 is disposed on the tubing guide 98 to clamp the lower edge of the end of a length of pipe 55 to prevent rotation of the pipe 55 with respect to the tubing guide 98 while the pipe is being slotted. Clamping on the lower edge of a pipe 55 allows various sizes of pipe 55 to be held as desired, utilizing the same clamping member 106. Two rollers, 107 and 108, are disposed between corresponding front and back vertical supports, 14 and 20, and, 16 and 18, respectively. The rollers, 107 and 108, have a spring loaded mounting to allow for constant pressure on the pipe 55. The purpose of the rollers 107 and 108, is to keep the pipe 55 from rotating around its axis while the slots are formed. The rollers, 107 and 108, rotate to allow repositioning the pipe 55 in a longitudinal direction. Collars 109 may be vertically repositioned on the vertical supports, 16–18 and 14–20, in order to adjust the position of the rollers, 107 and 108, to accomodate different diameters of pipes.

FIG. 2 shows a detailed perspective view of the ratchet 72. In the preferred embodiment, the clevis 71 slideably connects to the ratchet through slot 110, although a single hole may be employed in place of slot 110. Two guides 112, hold the circular chain 76 in its proper position against the engaging tooth 74, so as to prevent the chain 76 from dislodging from the engaging tooth 74, during movement of the ratchet 72. Brakes 114 are adjoined to upper stop bar 28 to impede movement of the ratchet 72 at the top of its cycle by abutting the engaging tooth 74. The brakes 114, in conjunction with the lower stop bar 26, ensure that the ratchet 72 travels the same distance on each cycle.

In operation, the apparatus works as follows. A pipe 55 or other material is positioned on the tubing guide 98 of the conveyor 97 in a position for the first cut. The clamping member 106 is attached to the bottom rear of the pipe 55 and the rollers, 107 and 108, rest on top of the pipe 55. At this point, the plate 32 and the blades 42 are in a raised position, to allow the pipe 55 to be placed thereunder. With the rotary sawblades 42 at rest, the lever mount 54 and the slideably adjustable bushings, 56 and 64, can be adjusted to accommodate the particular diameter of the pipe 55 to be cut. The adjustments should allow the connecting chain 68 to have sufficient slack, so as to allow the blades 42 to clear the uppermost surface of the pipe 55 before the ratchet 72 begins its upward motion. If the connecting chain 68 did not have sufficient slack, the ratchet 72 would initiate movement of the conveyor 97 along tracks 105 before the sawblades 42 had completely disengaged, causing damage to the pipe 55 and possibly to the rotary sawblades 42.

After the adjustments, if necessary, are made, the motor can be started. The lever arm and handle, 50 and 52, are then lowered by the operator, causing the plate 32 to pivot downward and the rotary sawblades 42 to engage with the pipe 55. The operator continues to pull the handle 52 towards himself until grooves of a proper depth have been obtained. At this point, the ratchet is in a rest position against the lower stop bar 26. After the grooves have been cut to a proper depth, the lever arm and handle, 50 and 52, are pushed away from the operator, thus raising the rotary sawblades 42 away from the pipe 55. As the lever arm 50 is pushed away from the operator, the piston 60 slides into the hydraulic/air cylinder 62, pulling the blade end of the plate 32 upward. It should be noted that the hydraulic/air cylinder 62 is not necessary for operation in the manuel mode, but is necessary for automatic operation as described hereinbelow. After the slack has been taken up by the rotation of the lever arm 50, the connecting chain 68 will pull the ratchet 72 upwards. The engaging spring 88 will force the engaging tooth 74 into one of the links 75 of the circular chain 76. The engaging tooth 74 is thus trapped between the peg 84 and the top surface of the link 75. As the ratchet 72 is pushed upward, the circular chain 76 will (in the illustrated example) begin a counterclockwise rotation. The rotation of the circular chain 76 results in a counterclockwise rotation of the upper and lower sprockets, 78 and 80. In turn, the lower sprocket 80 causes the drive shaft 92, and hence the driving sprocket 94, to also rotate counterclockwise. The driving sprocket 94 engages with the driving chain 96 causing the conveyor 97 to move from right to left.

As the operator continues to push the handle 52 forward, the ratchet 72 will continue to rise until the top of engaging tooth 74 comes into contact with the brakes 114 of the upper stop bar 28. The brakes 114 are applied to the engaging tooth 74, rather than the top of the ratchet 72, for two reasons. First, the brakes 114 forces the tip of the engaging tooth 74 into a horizontal position at the end of each upward stroke. This ensures that the engaging tooth 74 stops in precisely the same position for each cycle, thus providing for precise movement of the circular chain 76.

Secondly, the conveyor 97 would continue to roll forward, if unimpeded, at the end of the upward stoke of the ratchet 72, due to momentum. The momentum of the conveyor 97 will cause the other components, the driving sprocket 94, the drive shaft 92, the lower sprocket 80, and the circular chain 76, to continue to rotate counterclockwise (in the illustrated embodiment). If the engaging tooth 74 were free to rotate about pivot 82 counterclockwise, the circular chain 76 would continue to rotate, and the conveyor 97 would continue to roll. However, with the brakes 114 applied to the top of the engaging tooth 74, its rotation is impeded, and thus, the circular chain 76 is prevented from further rotation. Since the circular chain 76 cannot rotate, the conveyor 97 is likewise prevented from continued motion. Thus, by applying the brakes 114 to the engaging tooth 74, the conveyor 97 can be accurately and consistently positioned on each stroke. It should also be noted that the lowering spring 90 pulls the ratchet 72 outward, as well as downward; thus, the engaging tooth 74 cannot slip around the brakes 114.

The pipe 55 is now repositioned into the proper alignment for a new cut. At this point the operator once again pulls the handle 52 of the lever arm 50 towards himself and the ratchet 72 lowers, aided by lowering spring 90. As the ratchet 72 lowers, frictional forces prevent the circular chain 76 from rotating in the opposite (clockwise) direction, and thus the tip of engaging tooth 74 is pushed upwards. The engaging spring 88 resists rotation of the engaging tooth 74 on account of this force; however, the engaging spring 88 exerts only a slight force which is insufficient to overcome the frictional force of the drive train which includes the upper and lower sprockets, 78 and 80, the drive shaft 92, the driving sprocket 94 and the drive chain 96. Thus, the engaging tooth 74 rotates counterclockwise and slips out of its link 75 in the circular chain 76. As the ratchet 72 continues its downward path, the engaging tooth 74 slides along the sides of the circular chain 76 without causing any rotation thereof. After the downward movement of the ratchet 72 is impeded by lower stop bar 26, the operator will continue to pull the handle 52 of the lever 50 in order to engage the blades 42 with the pipe 55. The cycle can now be repeated, with the conveyor 97 moving forward a predetermined length on each upward stroke of the ratchet 72.

Although the above example illustrates a means of automatically moving the pipe 55 from left to right, the ratchet 72 can be adjusted to perform right to left movement of the pipe 55 as well. To effectuate a right to left movement of the conveyor 97 only two adjustments need be made. First, the clevis 68 is moved to the right side of the slot 110. Secondly, the engaging tooth 74 is rotated counterclockwise 180°, such that it now rests on the left side of the circular chain 76. In operation, as the ratchet 72 is raised, the circular chain 76 will rotate in a clockwise path, hence rotating the lower sprocket 80, the drive shaft 92, and the driving sprocket 94 in a clockwise rotation. Accordingly, the drive chain 96, the conveyor 97 and the pipe 55 will move from right to left.

The distance traveled by the conveyor 97 on each upward stroke of the ratchet 72 depends upon the distance between the lower and upper stop bars, 26 and 28. Although the illustrated embodiment shows a slot cutting apparatus with a fixed repositioning distance, another embodiment with variable repositioning distance could be made by allowing adjustment of the distance between the lower and upper stop bars, 26 and 28.

In another embodiment of the invention, a stationary conveyor without wheels could be used in place of the illustrated conveyor 97. In such an embodiment, the drive chain would rotate around the tube guide 98. A clamp attached to the drive chain would hold the pipe 55. A conveyor of this type is illustrated in U.S. Pat. No. 4,567,795, to James R. Pool.

It should also be noted that although the previous examples have described an embodiment of the invention used to slot pipe, the invention could also be used to cut other materials at uniform intervals. For example, the blades 42 could be replaced by a single blade for cutting material into uniform length pieces. In another embodiment, the blades could be replaced by a drill, in order to drill holes at regularly spaced intervals.

Furthermore, it should be noted that the apparatus 10 is capable of fully automatic operation with the addition of a control system to the hydraulic/air cylinder 62. Once the proper adjustments have been made to the first and second slideably adjustable bushings 56 and 64 on the lever arm 50 to account for the size of the material to be cut and the length between cuts, the hydraulic/air cylinder 62 could be used to pull the lever arm 50 back and forth to perform the required task. The only manual labor required would be to feed material onto the conveyor 97.

Although the preferred embodiment has been described in detailed, it should be understood that various changes, substitutions and alterations can be made therein without departing from the spirit and scope of the invention as defined by the appended claims.

What is claimed is:

1. An apparatus for operating on a workpiece, comprising:
   moveable carriage means for holding the workpiece in a horizontal position, said carriage means operable to move the workpiece back and forth along a set direction;
   working means for contacting the surface of the workpiece and operating on the workpiece in a predetermined manner;
   platform means attached to said working means, said platform means operable to move said working means towards and away from the workpiece disposed on said carriage means;
   incrementing means for interacting with said carriage means to move the workpiece a predetermined interval along its travel path in response to said platform means moving said working means away from the workpiece, said incrementing means having:
   a chain; and
   ratchet means operable between first and second points, said ratchet means engageable with said chain when moving from said first point to said second point, and said ratchet means retractable from said chain when moving from said second point to said first point; and
   said incrementing means activated when said platform means moves said working means away from the workpiece by a predetermined distance such that the workpiece can move along its travel path without making contact with said working means.

2. The apparatus of claim 1, wherein said ratchet means comprises:
   a backplate;
   tooth means for engaging with said chain, said tooth means rotatable about a fixed arc; and at least one guide for holding said chain against said chain when the tooth is in an engaging mode.

3. The apparatus of claim 2, wherein said ratchet means further comprises an engaging spring to provide a force to said tooth, such that said tooth will rotate towards said chain.

4. The apparatus of claim 2, wherein said incrementing means further comprises means for preventing said tooth from rotating away from said chain when said ratchet is at said second point.

5. The apparatus of claim 1, wherein said incrementing means further comprises:
a first sprocket disposed on said chain such that said sprocket rotates when said chain moves;
a shaft connected to said first sprocket; and
a second sprocket connected to said shaft and disposed upon said carriage means, such that said carriage means moves the workpiece along its travel path when said second sprocket rotates.

6. The apparatus of claim 1, wherein said carriage means comprises:
holding means for holding the workpiece; and
wheels disposed upon a track for moving said carriage means in response to said incrementing means.

7. The apparatus of claim 1, further comprising:
a cylinder having a bore formed therein; and
a piston slideably engaged within the bore in said cylinder having one end attached to said platform means such that the movement of said platform means is limited to movement of said piston within said cylinder.

8. The apparatus of claim 7, further comprising control means for automatically moving said piston within said cylinder.

9. An apparatus for operating on a workpiece, comprising:
moveable carriage means for holding the workpiece in an horizontal position, said carriage means operable to move the workpiece back and forth along a set direction;
working means for contacting the workpiece and operating on the workpiece in a predetermined manner;
platform means attached to said working means, said platform means operable to move said working means towards and away from the workpiece disposed on said carriage means;
a first chain interacting with said carriage means such that said workpiece moves along its travel path in response to movement of said first chain; and
ratchet means operable between first and second points said ratchet means moved from said first point to said second point as said platform means moves said working means away from said workpiece, said ratchet having a tooth means engageble with said first chain when moving from said first point to said second point, and said tooth means retractable from said first chain when moving from said second point to said first point.

10. The apparatus of claim 9 wherein said ratchet means further comprises an engaging spring which provides a force operable to rotate said tooth towards a horizontal position.

11. The apparatus of claim 9, wherein said apparatus further comprises:
second chain disposed on said carriage means such that movement of said second chain will cause movement of the workpiece along its travel path;
first sprocket disposed on said first chain;
second sprocket disposed on said second chain; and
shaft connecting said first and second sprockets, such that movement of said first chain will cause movement of said second chain, resulting in movement of the workpiece.

12. The apparatus of claim 9, further comprising:
first stopping means for preventing said ratchet means from moving beyond said first point in a direction away from said second point;
second stopping means for preventing said ratchet means from moving beyond said second point in a direction away from said first point; and
third stopping means disposed upon said second stopping means for preventing said tooth means from retracting from said first chain while said ratchet is at said second point.

13. The apparatus of claim 9, further comprising:
a cylinder; and
a piston slideably engaged within said cylinder having one end attached to said platform means such that the movement of said platform means is limited to movement of said piston within said cylinder.

14. The apparatus of claim 13, further comprising control means for automatically moving said piston within said cylinder.

15. The apparatus of claim 9 wherein said working means consists of a plurality of rotary sawblades for cutting slots in a length of tubing.

16. The apparatus of claim 9 wherein said working means consists of a single sawblade for cutting the workpiece into strips of a predetermined length.

17. The apparatus of claim 9 wherein said working means consists of at least one drill for drilling holes in the workpiece at set intervals.

18. A slot cutting apparatus for cutting a plurality of transverse slots in a length of flexible tubing, comprising:
carriage means for holding the tubing, said carriage means operable to move the tubing along the longitudinal axis of the tubing;
cutting means for engaging with the tubing and producing a plurality of slots therein;
platform means attached to said cutting means for moving said cutting means towards the tubing and away from the tubing in a predetermined path, such that said cutting means can be positioned to contact or to not contact the tubing;
a chain for incrementally advancing the tubing along its path of travel for a predetermined distance such that movement of the chain causes movement of the tubing;
ratchet means operable between first and second points, said ratchet means engageable with said chain when moving from said first point to said second point, and said ratchet means retractable from said chain when moving from said second point to said first point for controlling said chain to incrementally advance the tubing in response to said platform means moving from said cutting position to said non-cutting position, said ratchet means activated after said platform reaches a position such that the tubing can advance along its path without contacting said cutting means;

first stopping means for preventing said ratchet means from moving beyond said first point in a direction away from said second point;

second stopping means for preventing said ratchet means from moving beyond said second point in a direction away from said first point; and third stopping means disposed upon said second stopping means for preventing said tooth means from retracting from said first chain while said ratchet is at said second point.

19. The apparatus of claim 18, wherein said ratchet means comprises:
a backplate;
tooth means for engaging with said chain, said tooth means rotable about a fixed arc; and
at least one guide for holding said chain against said tooth when the tooth is in an engaging mode.

20. The apparatus of claim 19, wherein said ratchet means further comprises an engaging spring to provide a force to said tooth, such that said tooth will rotate towards said chain.

21. The apparatus of claim 18, wherein said incrementing control means further comprises means for preventing said tooth from rotating away from said chain when said ratchet is at said second point.

22. The apparatus of claim 18, wherein said carriage means comprises:
holding means for holding to the workpiece; and
wheels disposed upon a track for moving said carriage means in response to movement of said chain 23. The apparatus of claim 18, wherein said carriage means comprises:
supporting means for supporting the workpiece;
clamping means for securely holding the workpiece; and
driving means for moving said clamping means along said supporting means.

24. The apparatus of claim 18, further comprising:
a cylinder; and
a piston slideably engaged within said cylinder having one end attached to said platform means such that the movement of said platform means is limited to movement of said piston within said cylinder.

25. The apparatus of claim 24, further comprising control means for automatically moving said piston within said cylinder.

* * * * *